United States Patent Office 3,634,549
Patented Jan. 11, 1972

3,634,549
CONJUGATED DIENE BLOCK COPOLYMERS HAVING A RANDOM COPOLYMER ELASTOMERIC BLOCK AND THEIR HYDROGENATED COUNTERPARTS
Alfred W. Shaw, Stamford, Conn., and Eugene T. Bishop, Moraga, Calif., assignors to Shell Oil Company, New York, N.Y.
No Drawing. Filed Aug. 4, 1969, Ser. No. 847,444
Int. Cl. C08f 29/12, 33/08
U.S. Cl. 260—880 B
2 Claims

ABSTRACT OF THE DISCLOSURE

Block copolymers exhibiting substantially reduced set at high extension and improved resistance to oxidation comprise block copolymers having at least two non-adjacent hydrogenated butadiene polymer blocks, each pair of said blocks being separated by an elastomeric random diene-monovinyl arene copolymer block.

This invention is concerned with the preparation of improved block copolymers. More particularly, it is directed to a type of block copolymer which not only is highly resistant to oxidation but also exhibits substantially reduced set at high extension compared with prior art block copolymers.

In recent years a number of types of block copolymers have been prepared with the principal objective of synthesizing an elastomer which will not require vulcanization but will nonetheless possess the stress-strain properties of a vulcanized natural or synthetic rubber. For the most part, these comprise block copolymers of a thermoplastic block alternating with an elastomeric block, at least two terminal plastic blocks being required to impart the "self-vulcanizing" feature to the product. The earliest type of such block copolymers had the block structure polystyrene-polybutadiene-polystyrene. These have been hydrogenated and provide highly stable products which, however, exhibit certain shortcomings in some physical properties.

Another type of block copolymer which is highly resistant to oxidation comprises block copolymers of alpha olefins. A typical polymer of this type has the block structure polyethylene-EPR-polyethylene. These, however, show a tendency to cold draw and exhibit set at high extension. Other properties of the alpha olefin block copolymers known at this time are also deficient in one respect or another in other physical properties.

An alternative to the latter type of block copolymer comprises hydrogenated conjugated diene block copolymers wherein the precursor block polymer has the structure polybutadiene - polyisoprene - polybutadiene. When highly hydrogenated, e.g., to the extent to at least 80% of its original diene linkages, the product has substantially the same properties as an alpha olefin block copolymer and at the same time possesses similar disadvantages relative to set at high extension and a tendency to cold draw.

It is an object of the present invention to improve the physical properties of block copolymers. It is a particular object of the invention to provide improved block copolymers showing a reduced tendency to cold draw. It is a further and important object of the invention to provide a new block copolymer showing reduced extension and compression set. Other objects will become apparent during the following detailed description of the invention.

Now, in accordance with the present invention, improved block copolymers are provided having substantially reduced set at high extension, which comprises alternating blocks of butadiene polymer and random copolymer elastomeric blocks of dienes with monovinyl arenes, the basic block copolymer being hydrogenated so as to reduce at least about 80% of the butadiene and any other diene double bonds present therein. Still in accordance with the present invention, compositions are provided having substantially improved properties which comprise 20–400 parts by weight of certain polymers together with 100 parts by weight of the hydrogenated block copolymer just described. It has been found that the presence of the monovinyl arene copolymerized component in the elastomeric random blocks of the subject class of block copolymers provides, after hydrogenation, a substantially improved block copolymer with respect to set at high extension than is obtained with comparable block copolymers in which the monovinyl arene is omitted from the elastomeric random copolymer blocks.

The subject class of block copolymers prior to hydrogenation preferably has one of several general configurations although mixtures of these configurations may be employed if so desired. A linear type of block copolymer may be utilized, or a branched block copolymer may be employed as well as varieties intermediate between these which may be described as linear-branched block copolymers. The general configuration for the linear block copolymer is $A(B—A)_{1-5}$, while the branched and linear branched block copolymers may be described with the general formula

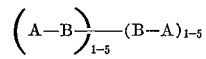

In each of the above formulae, each A is a polybutadiene block having an average molecular weight between about 5,000 and about 100,000 and each B is an elastomeric diene-monovinyl arene random copolymer block having an average molecular weight between about 25,000 and about 250,000, said random copolymer block having a weight percent of condensed monovinyl arene between about 10 and about 50. It will be understood that both the polymer blocks A and B may contain other minor substituents in their constitution as long as these additional monomers comprise no more than 25 weight percent of that particular block.

The conversion of the above types of block copolymers to their hydrogenated counterparts is readily effected as will be described hereinafter. Upon hydrogenation, the polybutadiene blocks then closely resemble polyethylene blocks while the random copolymer blocks have the structure of alpha olefin copolymerized with either a monovinyl arene or the saturated counterpart thereof. Both of these types are contemplated as within the scope of the present invention.

More particularly, the basic block copolymer contemplated has three polymer blocks, the two end blocks being polybutadiene and the random elastomeric copolymer block separating these two polybutadiene blocks being an isoprene-styrene copolymer block. It is, of course, possible to employ more than one conjugated diene in the random copolymer block or even to employ butadiene as the diene component therein especially if conditions are employed to cause a sufficient amount of branching, i.e., 1,2-content thereof so when hydrogenated the resulting saturated diene portions of the random copolymer block more nearly resemble ethylene-butene-1 rubber segments than they do a linear polyethylene segment. This type of product should contain at least about 35–55 mol percent of its condensed diene units wherein one or more of the carbon atoms in said condensed unit is in a side chain which is either a methyl or ethyl side chain, for example. The hydrogenation of the subject block copolymers is effected with a variety of catalysts some of which are non-selective and are utilized for the substantially complete hydrogenation of the polymer chains or it may be selective to the extent of substantially completely hydrogenating the diene double bonds therein while either leaving the monovinyl arene double bonds unaffected or hydrogenating only less than about 20% thereof.

While the preferred monomer to be used in the elastomeric copolymer block in addition to the monovinyl arene is isoprene, other dienes may be so employed. For example, butadiene may be utilized as long as steps are taken to deliberately cause the formation of vinyl side chains which when hydrogenated result in structures more nearly resembling a rubbery olefin copolymer block. This is readily effected by the presence of controlled amounts of polar compounds such as dialkyl ethers, tetrahydrofuran, or secondary amines. Preferably in order to obtain the desired degree of vinyl content, i.e., 35–55 mol percent of the diene units, the polar compound to lithium molar ratio should be between about 200 and about 300. Diethyl ether is preferred for this purpose although tetrahydrofuran or mixtures thereof with diethyl ether may be readily employed. Futhermore, of course, it is possible to utilize mixtures of diene monomers such as mixtures of butadiene with isoprene to obtain further control over the degree of branching in the elastomeric center block.

The preparation of the non-hydrogenated block copolymers follows processes already known in the block polymerization art. For example, the copolymers may be formed by a so-called sequential process, a sequential-coupling process, or by the use of polyfunctional polymerization initiators. The sequential process involves the use of a monofunctional initiator such as a lithium alkyl. In this type of process the initial step comprises polymerization of butadiene with the lithium alkyl such as secondary butyl lithium or other alkyl lithium compounds containing less than about 8 carbon atoms in the alkyl radical. Preferably an inert hydrocarbon solvent such as alkanes, alkenes, or mixtures thereof with cycloalkanes and cycloalkenes. Typical solvents include butanes, pentanes, hexanes, and cyclohexanes. The proportion of initiator to butadiene will determine the average molecular weight of the polymer block formed thereby. After the desired molecular weight of the first polybutadiene block has been achieved, and without killing the lithium ion which is associated with the growing end of the polymer chain, the elostomeric random copolymer blocks is then formed by the addition of a mixture of a conjugated diene with styrene. Since the conjugated diene usually reacts at a substantially higher rate than does styrene, it is the general practice to initiate the polymerization of this block with a desired ratio of the two monomers all of the styrene being present but only a limited proportion of the conjugated diene being initially present. Thereafter during the formation of the random copolymer block the balance of the diene monomer is programmed into the reactor so that the entire block is relatively uniform in its constitution. Thereafter, any remaining mixture of mid-segment diene and monovinyl arene is swept from the reactor and butadiene monomer is injected, polymerization being continued to form the second polybutadiene block.

The sequential-coupling process may be employed although in view of the subsequent hydrogenation step the above described sequential process is preferred. The sequential-coupling process is carried out by performing the first step described above, namely, the formation of a first polybutadiene block utilizing a monofunctional initiator such as a lithium alkyl compound. Thereafter a relatively short random copolymer block of diene with monovinyl arene is made and this intermediate block copolymer is then coupled with a polyfunctional coupling agent which may be difunctional or of higher functionality. A difunctional coupling agent such as a dihalohydrocarbon will result in two of the intermediate block copolymers being coupled to form a relatively linear coupled product. However, branched polymers may be formed by the use of coupling agents having high functionality, of which diesters of monohydric alcohols and dicarboxylic acids are preferred. Surprisingly, these diesters result in coupled products which are either trimers or tetramers of the intermediate block copolymers. These products are referred to as branched, radial, star-shaped, or by other descriptive terminology.

The use of polyfunctional initators reduces the number of individual polymerization steps although this advantage may be counterbalanced by other process or product disadvantages in particular instances. A polyfunctional initiator such as dilithio stilbene and the like may be employed as well as and preferably dilithio alpha methyl styrene. In the use of such an initiator, the first step comprises the formation of the elastomeric random diene-monovinyl arene copolymer block and when a difunctional initiator is employed this results in the formation of a block having two lithium ions associated with the two growing ends of the polymer chain. After the formation of this block, the butadiene blocks are formed simply by the introduction of butadiene into the polymerization mixture at which time the two end blocks are formed simultaneously.

It will be understood that the above description of the three basic processes employed for the preparation of block copolymers are simply for illustrative purposes only and may be elaborated for the preparation of multi-block copolymers. The multi-block copolymers are formed by changing the monomer feed as often as desired as long as at least two of the polymer blocks are non-adjacent butadiene polymer blocks and at least one block is an elastomeric random diene-monovinyl arene copolymer block. Typical conjugated dienes which may be employed in these processes are especially butadiene and isoprene although higher homologs and analogs thereof may be utilized. The preferred monovinyl arenes to be employed in the random copolymer blocks are styene and alpha methyl styrrene.

The resulting block copolymers may have a variety of configurations as referred to hereinbefore. These may be linear, branched, or a combination of linear with branched configurations. Each of these has particular advantages for specific functional purposes.

The weight percent of monovinyl arene units in the random copolymer block has a substantial effect upon the reduction in set at high extension while at the same time any change in elastomeric properties otherwise is not materially affected or is improved. Therefore, the proportion of monovinyl arene units should be confined between about 5 and about 50 weight percent of the total monomers utilized in the elastomeric random copolymer block and preferably the weight percent is confined to range between about 10 and about 30. Within these ranges, the set at high extension is substantially reduced from that of a block copolymer otherwise comparable to those of the present invention but from which the monovinyl arene component has been omitted. In the polymers constituting the object of this invention, values of 5–50% may be achieved compared to values of 30–150% in corresponding polymers where the monovinyl arene has not been copolymerized into the elastomeric block.

The linear block copolymers are defined by the general configuration $A\text{-}(B\text{-}A)_{1-5}$ although a higher number of linear blocks may be employed if so desired. The preferred branched block copolymers may be generally defined by the general formula

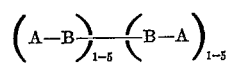

although again a greater number of the parenthesized B–A grouping may be utilized if so desired. This type of configuration is that which results from the above described sequential-polyfunctional coupling agent process wherein the coupling agent has a functionality greater than two. On the other hand, it is also possible to prepare intermediate block copolymers having more than two polymer blocks A–B. For example, a six block intermediate block copolymer may be formed having the general configuration (A—B)₃—Li. When this in turn is coupled by means of a polyfunctional coupling agent this may result either in the linear configuration when a difunctional coupling agent is employed or in the branching configuration obtained by the use of a tri or higher functional coupling agent.

Having obtained the initial block copolymer of this invention, the subsequent step required to produce the desired type of elastomer is hydrogenation. This is effected in solution and under a hydrogen atmosphere which may vary between about 1 to 1500 atmospheres pressure and at temperatures which may vary from about 0 to 200° C. in the presence of a variety of catalysts such as nickel-on-kieselguhr, or more preferably, reaction of products of aluminum alkyl compounds with nickel or cobalt or rhodium salts or alkoxides. Typical of these are nickel carboxylates, cobalt carboxylates, nickel acetyl acetonates, nickel diisopropyl salicylate, cobalt butoxide, and the like. The aluminum compound is preferably an aluminum trialkyl wherein the alkyl radical may have from 2 to 8 carbon atoms. Typical species of these include aluminum triethyl, aluminum triisobutyl, and aluminum trioctyl. The reaction products which are suitable as hydrogenation catalysts generally have aluminum to cobalt or nickel or iron, chromium, tungsten metal molar ratios between about 0.25 and about 5 although the more preferred range of molar ratios lie within the range of between about 0.75 and about 3.

While it is possible to substantially completely hydrogenate all of the double bonds present in the entire block copolymer, it is only necessary to hydrogenate at least about 80% of the conjugated diene double bonds present therein order to achieve an elastomer having the desired properties. Selectivity and hydrogenation may be achieved either by the selection of the catalyst or by selection of hydrogenation conditions, particularly time, temperature, and hydrogen pressure as well as catalyst concentration. Normally, the concentration of polymer being hydrogenated should be between about 1,000 and about 3,000 grams per gram of catalyst. The selective hydrogenation may be effected with nickel or cobalt acetyl acetonate, nickel diisopropyl salicylate or even nickel or cobalt octonate, all of these being reduced with one of the above type of aluminum compounds.

The resulting products obtained in accordance with the present invention may be generally described as thermoplastic elastomers since they possess the general properties of thermoplastics and can be processed in thermoplastics processing equipment but at the same time, below their softening points, they exhibit the properties of rubbers which of other types would require vulcanization. In other words they exhibit high tensile strength, high extensibility and other related properties. The advantage of the presence of the monovinyl arene units in the elastomeric random copolymer blocks are proved by the substantial reduction in set at high extension. ASTM Test D412 is employed using an elongation of 5.00%. In this test, the rubber sample is extended over a period of 15 seconds to its maximum extension, left there for a period of 10 minutes after which the tension is released. The extent of set is noted after 10 minutes following the release of tension. Set measured in this manner is regarded as a measure of the rubbery or "snappy" response of an elastomer.

EXAMPLE I 10 grams of butadiene are polymerized in isopentane solution, using lithium sec-butyl (−0.34 millimole per mol of butadiene) as the initiator. The temperature of polymerization is 50° C., and requires 90 minutes. After completion of this first block, 9 grams of styrene are injected into the polymerization mixture and 2.5 grams of isoprene are monitored immediately into the polymerization mixture over a period of 2 hours as the random copolymer block is formed. 10 grams of butadiene are added and the polymerization was allowed to form the third block. The product had the structure polybutadiene-(styrene-isoprene copolymer)-polybutadiene. Molecular weight determination indicated the average molecular weight being 155,000–160,000.

The block copolymer is then subjected to hydrogenation at 130° C., 750 p.s.i. H₂ pressure for 300 minutes in the presence of a catalyst comprising the reaction product of 2 moles aluminum triethyl with 1 mole and nickel octoate. A ratio of 2,000 grams of polymer per gram of catalyst was utilized. Following the hydrogenation, catalyst is removed by washing with dilute aqueous HCl and then with water. Finally the product is coagulated with steam and collected as a crumb in a hot water bath. The product is found to have 98% of its original diene unsaturation reduced by hydrogenation.

A comparative product is prepared using essentially the same polymerization and hydrogenation conditions but omitting styrene from the center block. This product has excellent elastomeric properties except for a relatively large set at high extension. The styrene-containing block copolymer, on the other hand, not only had the same satisfactory elastomeric properties, but also exhibited substantially lower set at high extension.

We claim as our invention:

1. A hydrogenated block copolymer wherein the polymer, prior to hydrogenation, has the general configuration of the group consisting of

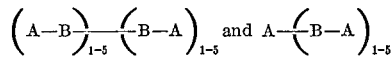

wherein each A is a polybutadiene block having an average molecular weight between about 5,000 and about 100,000 and each B is an elastomeric diene-monovinyl arene random copolymer block having an average molecular weight between about 25,000 and about 250,000 and a weight percent condensed monovinyl arene between about 5 and about 50, and wherein at least about 80% of the butadiene and diene double bonds are reduced by hydrogenation.

2. A block copolymer according to claim 1 having, prior to hydrogenation, the configuration polybutadiene-(isoprene-styrene copolymer)-polybutadiene wherein each polybutadiene block has an average molecular weight between about 5,000 and about 100,000, the isoprene-styrene copolymer block has an average molecular weight between about 25,000 and about 250,000, the weight percent of copolymerized styrene in said block being between about 5 and about 50.

References Cited

UNITED STATES PATENTS

| | | | |
|---|---|---|---|
| 3,231,635 | 1/1966 | Holden et al. | 260—880 |
| 3,251,905 | 5/1966 | Zelinski | 260—880 |
| 3,431,323 | 3/1969 | Jones | 260—880 |

SAMUEL H. BLECH, Primary Examiner

U.S. Cl. X.R.

260—876 B, 878 B